United States Patent [19]
Ohmori et al.

[11] Patent Number: 5,566,296
[45] Date of Patent: Oct. 15, 1996

[54] METHOD AND APPARATUS FOR ELIMINATING NOISES WITH A READ OPERATION OF MAGNETIC DISK UNIT

[75] Inventors: Hideki Ohmori; Shuichi Hashimoto, both of Kawasaki, Japan

[73] Assignee: Fujitsu Limited, Japan

[21] Appl. No.: 329,450

[22] Filed: Oct. 26, 1994

[51] Int. Cl.⁶ .............................. G11B 5/02; G06F 11/34
[52] U.S. Cl. .............................................. 395/180; 360/55
[58] Field of Search .............................. 395/575, 183.16, 395/183.18, 183.19, 184.01, 180, 427; 371/11.1, 11.2; 360/55, 66, 69, 71

[56] References Cited

U.S. PATENT DOCUMENTS

| | | | |
|---|---|---|---|
| 3,705,272 | 12/1972 | Tsuji et al. | 360/62 |
| 4,241,420 | 12/1980 | Fish et al. | 364/900 |
| 5,051,972 | 9/1991 | Yamamuro | 369/32 |
| 5,088,023 | 2/1992 | Nakamura et al. | 395/425 |
| 5,276,839 | 1/1994 | Robb et al. | 395/425 |
| 5,444,579 | 8/1995 | Klein et al. | 360/67 |

FOREIGN PATENT DOCUMENTS

| | | |
|---|---|---|
| 59-077636 | 5/1984 | Japan . |
| 3142715 | 6/1991 | Japan . |
| 4057230 | 2/1992 | Japan . |

*Primary Examiner*—Robert W. Beausoliel, Jr.
*Assistant Examiner*—Trinh L. Tu
*Attorney, Agent, or Firm*—Greer, Burns & Crain, Ltd.

[57] ABSTRACT

A processor of a drive unit positions a head to a designated cylinder position of a disk medium on the basis of a command notified from an upper controller through a data bus and amplifies a read signal by a read amplifier and, after that, transmits the amplified read signal to the upper controller through a read signal line. A data disconnecting circuit is provided for the data bus from an upper apparatus to the processor. The data disconnecting circuit switches the data bus to a disconnection state by a control signal which is generated from the upper apparatus during the data reading operation. When the control signal is interrupted by the end of the data reading operation, the data bus is returned to the connection state.

9 Claims, 7 Drawing Sheets

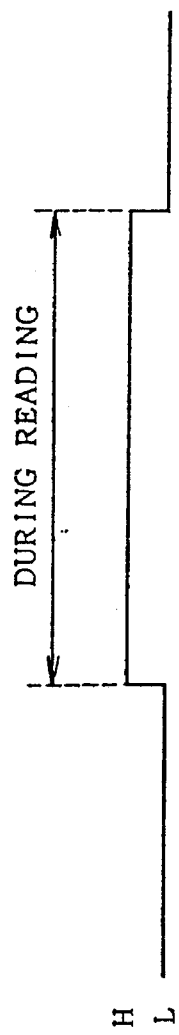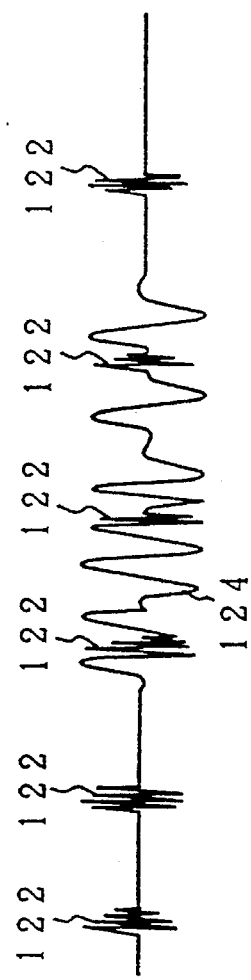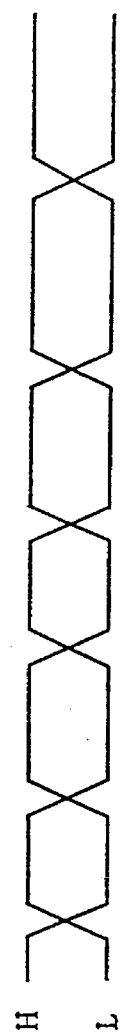
FIG. 3A
FIG. 3B
FIG. 3C

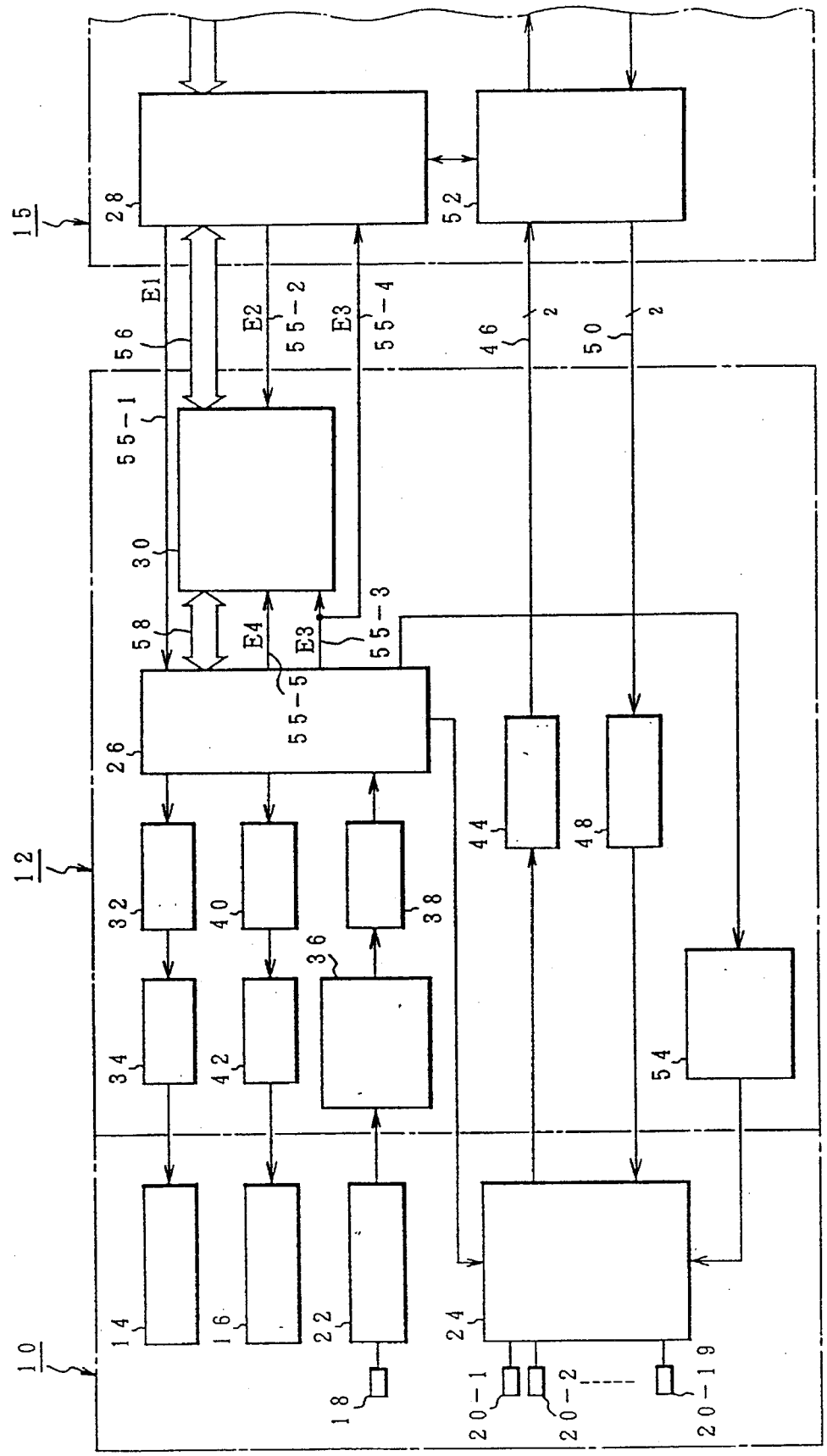

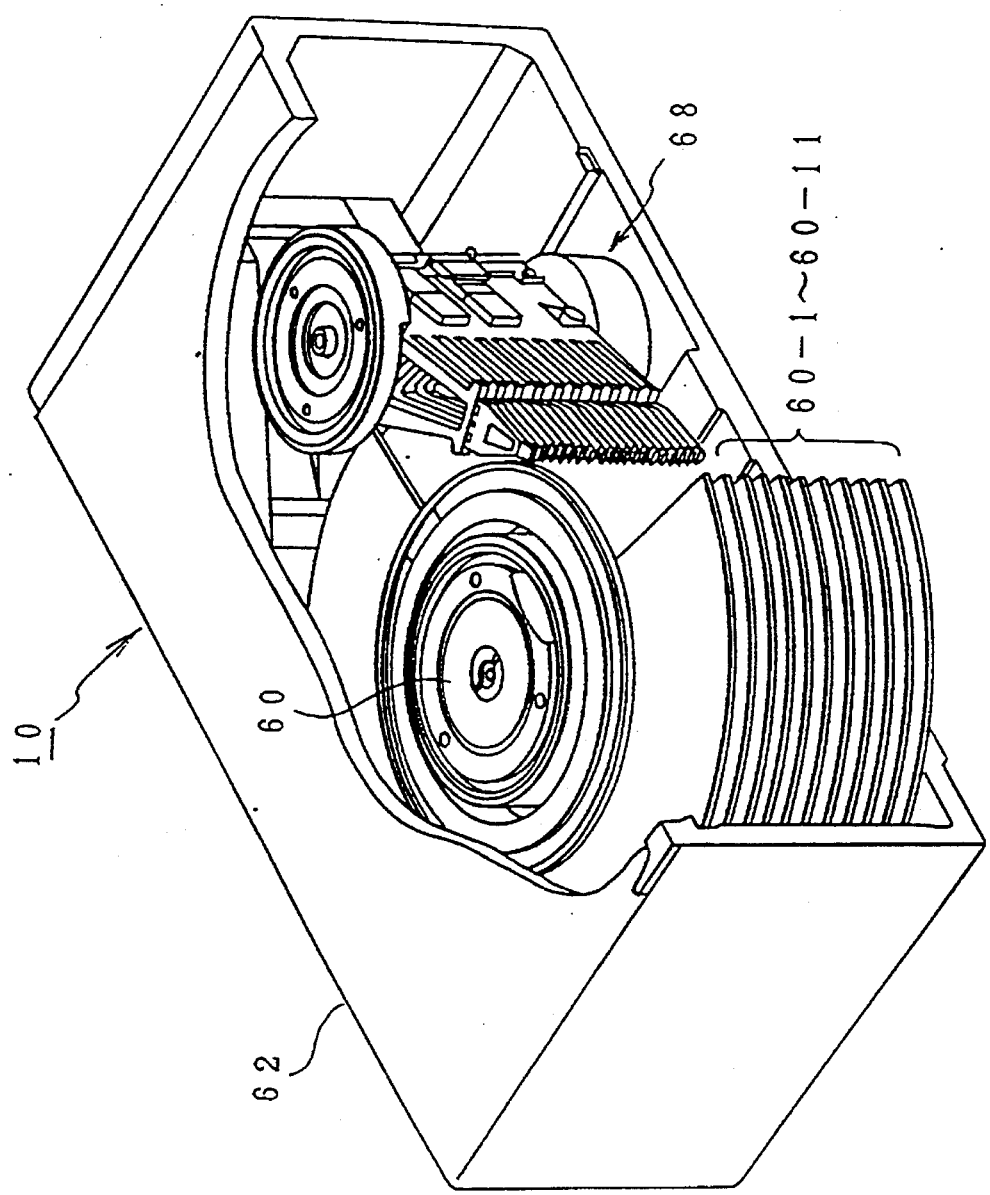

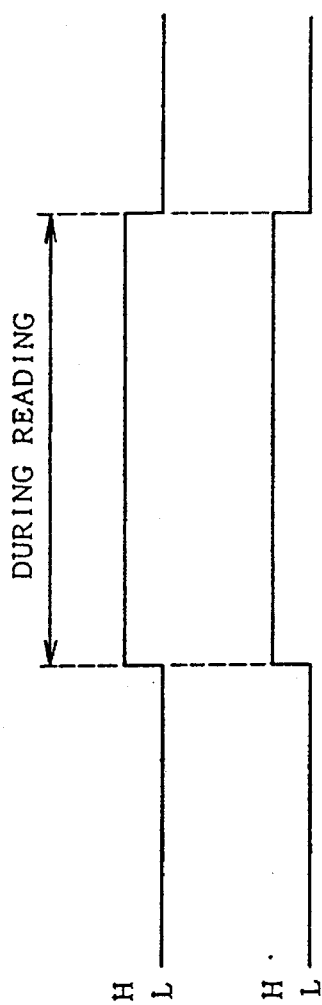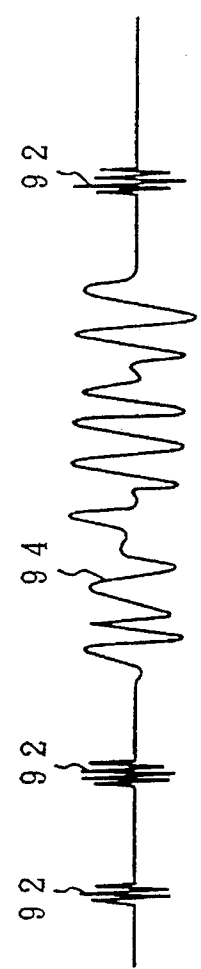
FIG. 8A
FIG. 8B
FIG. 8C
FIG. 8D

5,566,296

METHOD AND APPARATUS FOR ELIMINATING NOISES WITH A READ OPERATION OF MAGNETIC DISK UNIT

BACKGROUND OF THE INVENTION

The present invention relates to noise eliminating apparatus and method of a magnetic disk unit for preventing that noises are mixed into a read signal which is read out from a disk medium and is transmitted to an upper apparatus and, more particularly, to noise eliminating apparatus and method of a magnetic disk unit for preventing that noises which are generated by the operation of a data bus for connecting a drive unit with an upper apparatus are mixed into a read signal.

In a magnetic disk subsystem which is used as an external memory apparatus of a computer, one or a plurality of drive units are connected under the domination of an upper disk controller. As such a subsystem, there are a concentrated processing type and a distributed processing type. In the concentrated processing type, a formatter is provided for the upper controller and, in the reading mode, an analog read signal is generated from the drive unit, thereby reconstructing read data on the controller side. In the distributed processing type, a formatter is provided for each drive unit and all of the read data is reconstructed by the drive unit and is transmitted to the upper apparatus. The present invention belongs to the former concentrated processing type.

In the case where the formatter section is provided for the upper controller, when receiving a seek command from the upper controller, the drive unit moves a head to a designated cylinder address by the driving of an actuator by a voice coil motor. The actuator for positioning the head is generally controlled by a micro processor or a digital signal processor.

When the drive unit notifies the completion of the seeking operation to the upper controller, an analog write signal is transmitted by a write signal line in the writing mode and is supplied to a write head and is written into a disk medium. In the reading mode, when receiving a confirmation notification from the upper controller for the seek completion response, a read signal of a read head (MR head) is amplified by a reading amplifier and is transmitted to the upper controller by a read signal line.

FIG. 1 is a schematic diagram of a conventional magnetic disk drive unit comprising: a disk enclosure 100; a reading amplifier board 102; and a drive analog board 104 on which a processor 106 is installed. The disk enclosure 100 is a mechanism portion having a disk medium, a head, an actuator, a voice coil motor, a spindle motor, and a head IC. A reading amplifier with an AGC function is installed on the reading amplifier board 102. In addition to the processor 106, a D/A converter, an A/D converter, a servo demodulating circuit, and the like are installed on the drive analog board 104. The processor 106 on the drive analog board 104 is connected with the upper controller by a read signal line 108, a write signal line 109, and a data bus 110 and transmits and receives various kinds of commands, the write signal, and the read signal.

The head provided for the disk enclosure 100 integrally supports a write head and a read head at the edge of the actuator. Hitherto, a magnetic head has been used as each head. On the other hand, in recent years, a small MR head using a magnetoresistive device is used as a read head in order to improve a track recording density. The MR head can be miniaturized as compared with the magnetic head and also has a high magnetic converting efficiency. Assuming that those heads have the same intensity of magnetic field, the MR head generates a read voltage higher than that of the magnetic head. In order to make the MR head operative as a magnetoresistive device, it is necessary to supply a predetermined bias current in the reading mode. For this purpose, a bias voltage of about 2.0 V is supplied from the drive analog board 104 to the disk enclosure 100 via a bias signal line 112, thereby applying the bias voltage to the MR head. Further, when the MR head to which the bias voltage was applied is come into contact with the disk medium, an excessive short-circuit current flows, thereby causing a head breakage. Therefore, by also supplying the same bias voltage to both of the disk medium and the casing side, they are set to the same potential and a head breakage is prevented.

The realization of a miniaturization and a high density of the magnetic disk unit is remarkable in recent years. The inventors of the present invention has examined to miniaturize the drive unit of FIG. 1, so that a drive unit in which an area of a printed circuit board is reduced to about the half could be developed as shown in FIG. 2. In this case, in addition to the miniaturization of a disk enclosure 114, a reading amplifier 118 is installed on a drive analog board 116 together with a processor 120.

In the miniaturized drive unit in FIG. 2, however, there occurs a problem such that fairly large noises 122 are periodically mixed to a read waveform 124 in FIG. 3B which is generated in an active state of a read gate in FIG. 3A in the upper controller, so that read data cannot be accurately reconstructed. By examining a generation source of the noises 122 which are mixed to the read waveform 124, it has been found that the noises were generated synchronously with the switching operation of a data bus in FIG. 3C. Such noises of the read waveform don∝t cause a problem in the drive unit in FIG. 1 and appear for the first time by remarkably miniaturizing as shown in FIG. 2.

The first cause of the mixture of the noises is that the bias voltage is applied to the MR head. The bias voltage of about 2.0 V is applied from the drive analog board 116 to the MR head of the disk enclosure 114. In association with the miniaturization of the circuit board, the noises generated by the operation of the data bus are mixed to the bias voltage generated in the bias voltage generating circuit and are supplied to the MR head, so that the noises appear in the read signal. Although an output voltage of the MR head is generally equal to about 0.5 mV, noises of about 50 mV which is 100 times as large as such an output voltage are mixed according to the actual measurement. A head IC provided for the disk enclosure 114 uses a differential circuit to prevent noises. However, in case of such large noises of 50 mV, a difference between noises mixed to two differential signal lines appears in an output.

The second cause of the mixture of noises is that since the area of the printed circuit board is reduced, a distance between the read signal line 108 and the data bus 110 decreases and noises by crosstalk are easily mixed. Since the noises by the crosstalk increase in proportion to the square of the distance between the signal lines, it is considered that such a short distance becomes a cause.

SUMMARY OF THE INVENTION

According to the invention, there is provided a magnetic disk apparatus having a high reliability in which noises by the operation of a data bus are not mixed to a read signal and no read error occurs even if a circuit board is miniaturized.

According to the invention, a drive unit has a processor for positioning a head to a designated cylinder position of a disk medium on the basis of a command notified from an upper apparatus, for reading out information, and for transmitting an analog read signal to the upper apparatus via a read signal line. The processor and the upper apparatus are connected by the data bus. In order to prevent that the noises generated by the operation of the data bus are mixed into the read signal, a data bus disconnecting circuit is provided for the data bus for connecting the processor and the upper apparatus. The data bus disconnecting circuit switches the data bus to a disconnection state by a control signal which is outputted from the upper apparatus during the data reading operation. When the control signal is interrupted by the completion of the data reading operation, the disconnecting circuit switches the data bus to a connection state. That is, the data bus is switched to the disconnection state by a control signal which is generated in an active state of a read gate in the upper apparatus.

A microprocessor of the drive unit moves an actuator on the basis of a seek command, thereby moving the head to a necessary read cylinder position. For this purpose, during the reading operation, the head is on-track controlled to the read cylinder and it is unnecessary to receive the seek command from an upper controller. Therefore, even if the data bus is disconnected during the reading operation in which there is no need to move the actuator, no problem will occur. When the magnetic disk finishes the reading operation, the data bus is returned to the original connection state and the microprocessor receives the command and is set to a state in which the actuator can be controlled.

In the case where an error occurs during the data reading operation, the processor of the drive unit generates an error generation interruption signal to the upper apparatus and the data bus disconnecting circuit. In this instance, when receiving the error generation interruption signal from the processor in the disconnection state of the data bus, the data disconnecting circuit returns the data bus to the connection state.

Further, the processor of the drive unit generates a bus release request signal to the data bus disconnecting circuit when receiving a command notification signal indicating that a command is generated from the upper apparatus during the data reading operation. When receiving the bus release request signal from the processor in the disconnection state of the data bus, the data bus disconnecting circuit returns the data bus to the connection state.

The drive unit of the present invention comprises: a drive controller having a processor; and a disk enclosure having a disk medium, a head, a head actuator, and a spindle motor. The head integrally includes a write head and a read head. At least the read head is an MR (magnetoresistive) head. A predetermined bias voltage is applied to both of the MR head and the disk medium from the drive controller side. As a processor of the drive unit, for example, a digital signal processor is used.

According to a noise eliminating method of the magnetic disk apparatus of the invention, the data bus for connecting the processor and the upper apparatus is switched to the disconnection state on the basis of a command notified from the upper apparatus for a period of time during which a read signal is being transmitted from the drive unit having the processor via the read signal line. After completion of the data reading operation, the data bus is returned to the connection state. Thus, it is prevented that the noises generated by the operation of the data bus during the data reading operation are mixed into the read signal from the head.

The switching operation to the disconnection state of the data bus in the drive unit is performed by the control signal generated in the active state of the read gate in the upper apparatus. In the case where a read error occurs in the drive unit, the data bus in the disconnection state is returned to the connection state. In the case where the drive unit receives the command notification signal indicating that a command is generated from the upper apparatus during the data reading operation, the data bus in the disconnection state is also returned to the connection state.

The above and other objects, features, and advantages of the present invention will become more apparent from the following detailed description with reference to the drawings.

BRIEF DESCRIPTION OF THE DRAWINGS

FIGS. 3A to 3C are timing charts of the mixture of noises to a read waveform in association with the miniaturization in FIG. 2;

FIG. 4 is a block diagram of a hardware construction of the invention;

FIG. 5 is an explanatory diagram of a structure of a disk enclosure in FIG. 4;

FIGS. 8A to 8D are timing charts of the noise elimination by a disconnection of a data bus of the invention.

DETAILED DESCRIPTION OF THE PREFERRED EMBODIMENT

Figure 1:
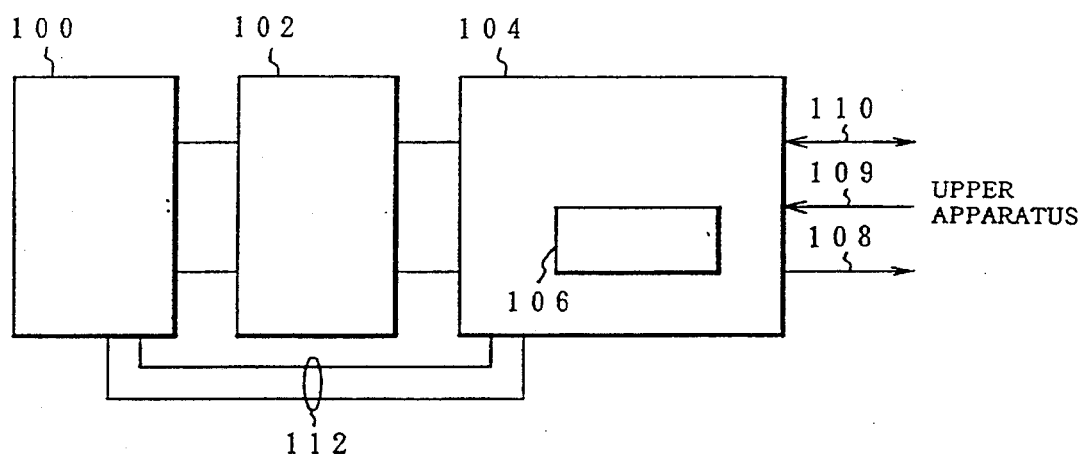
FIG. 1 is an explanatory diagram of a board construction of a conventional drive unit.
Figure 2:
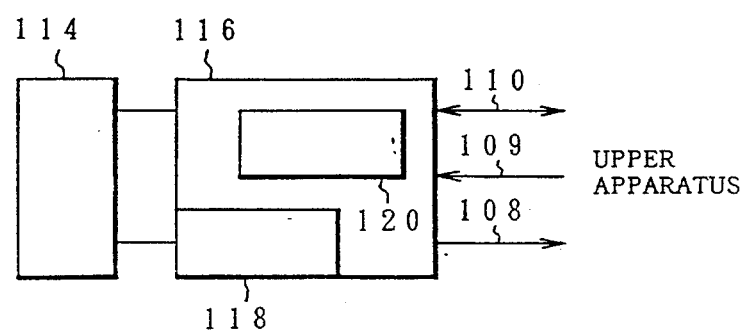
FIG. 2 is an explanatory diagram of a board construction of a miniaturized drive unit.

In FIG. 4, a magnetic disk drive unit of the invention comprises a disk enclosure 10 and a drive controller 12. A spindle motor 14 for rotating a disk and a voice coil motor (hereinbelow, referred to as a "VCM") 16 for activating a head are provided for the disk enclosure 10. In order to read out information of the servo surface of the magnetic disk, a servo head 18 and a servo head IC 22 are provided. Further, in order to read and write information of a plurality of data surfaces, data heads 20-1 to 20-19 and a data head IC 24 are provided. Each of the data heads 20-1 to 20-19 integrally includes a write head and a read head in a head portion. A magnetic head is used as a write head and an MR head using a magnetoresistive device is used as a read head. The MR head performs the reading operation in a state in which a bias current flows by supplying a bias voltage from the drive controller 12 side in the reading operation.

With respect to core widths of the servo head 18 and the write heads and read heads which are provided for the data heads 20-1 to 20-19, there are relations such that the core width of the servo head 18 is largest and the core width of each of the write heads is subsequently large and the core width of each of the read heads (MR heads) is smallest. Assuming that the track pitch of the data surface is set to, for example, 7 μm, the core width of the servo head 18 is set to 7 μm which is almost equal to the length of the track pitch. On the other hand, the core width of the write head provided for the data head is equal to 6 μm. The core width of the MR head as a read head is set to about 3 μm which is the half of the core width of the write head.

FIG. 5 shows an internal structure of the disk enclosure 10 in FIG. 4. Eleven magnetic disks 60-1 to 60-1 are rotatably built in a casing 62 of the disk enclosure 10 so as to be rotatable by the supporting of a rotary axis 64 and are rotated by a spindle motor (not shown) provided in the lower portion. A head actuator 68 is arranged on the right side of the magnetic disks 60-1 to 60-11 and enables a head attached at the edge to be integrally moved in the radial direction of the medium surface of each of the magnetic disks 60-1 to 60-11. In the embodiment, disks each having a diameter of 5.25 inches are used as magnetic disks 60-1 to 60-11.

Figure 6:
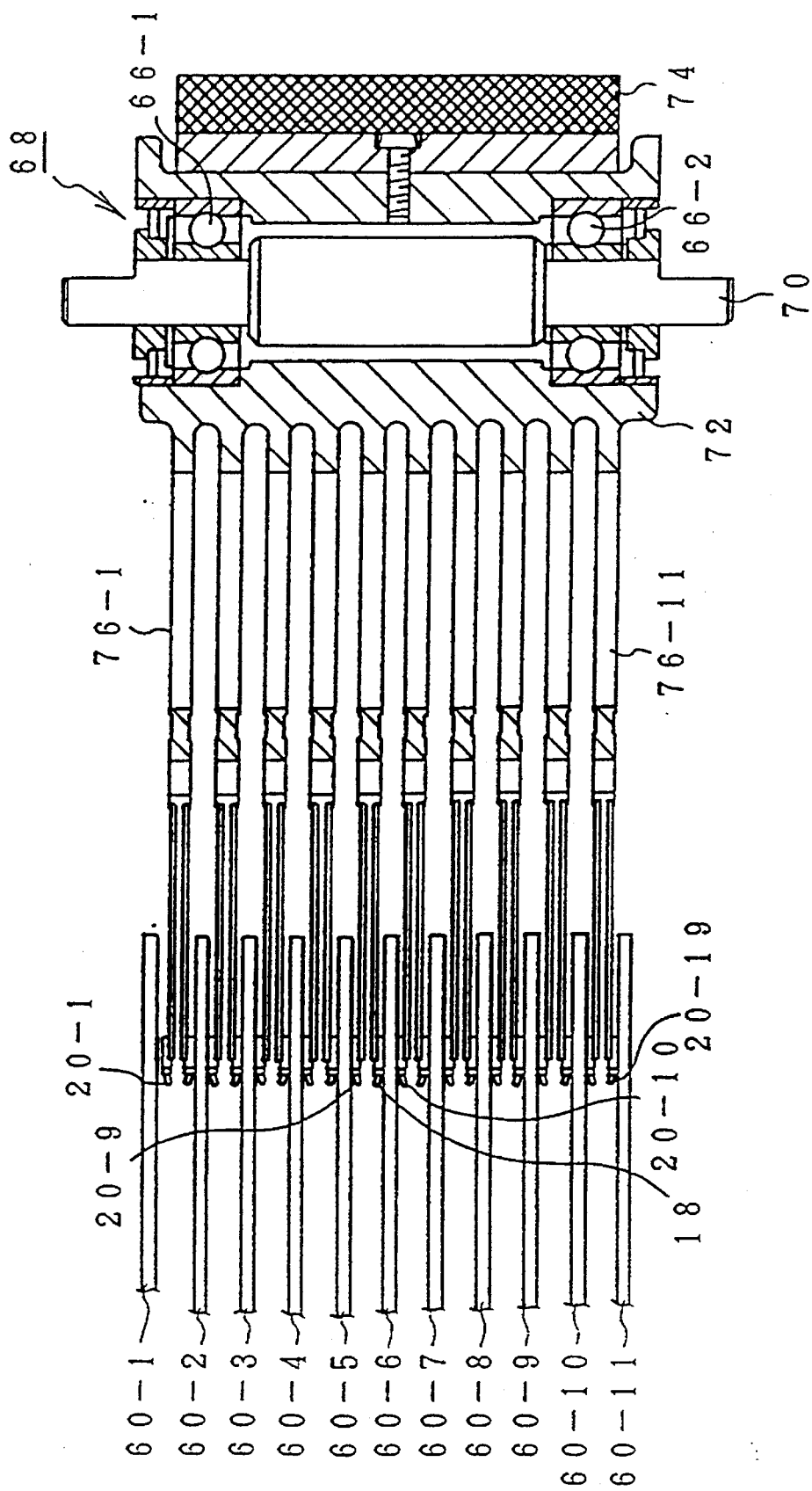
FIG. 6 is a side sectional view of a head actuator in FIG. 5.

FIG. 6 is a vertical sectional view of the head actuator 68 in FIG. 5. In the head actuator 68, a block 72 is rotatably attached through upper and lower bearings 66-1 and 66-2 to a shaft 70 which is fixedly provided. A coil 74 of the VCM 16 is attached on the right side of the block 72. Eleven arms 76-1 to 76-11 are integrally extended on the left side of the block 72. Two heads are supported at the edge of each of the arms 76-1 to 76-11 through a pair of spring arms. In the embodiment, twenty heads are provided for the eleven magnetic disks 60-1 to 60-11. The upper nine heads among those heads are the data heads 20-1 to 20-9 among those heads and, subsequently, the servo head 18 is provided. The remaining ten heads subsequent to the servo head 18 are the data heads 20-10 to 20-19. The disk surfaces of the magnetic disks 60-1 to 60-11 which the data heads 20-1 to 20-19 face are set to data surfaces which are used in the reading and writing operations of data. On the other hand, a medium surface on the upper side of the magnetic disk 60-6 over which the servo head 18 is positioned is set to a servo surface on which servo information has been recorded on all tracks. The reason why the medium surface of the central magnetic disk 60-6 is set to the servo surface is to minimize the distances from the central servo surface to the farthest magnetic disks 60-1 and 60-1, thereby minimizing an offset of the data surface by a mechanical deformation due to a temperature change.

Although a predetermined bias voltage is applied to each of the MR heads provided for the data heads 20-1 to 20-19, for example, the bias voltage can be applied by connecting a supply line of the bias voltage to the block 72 made of aluminum. Further, since the bias voltage is applied to the MR heads, when the heads come into contact with the magnetic disks 60-1 to 60-11, the heads are broken by a short-circuit current. To prevent such a situation, the same bias voltage is also applied to the magnetic disks 60-1 to 60-11. The bias voltage can be applied to the magnetic disks 60-1 to 60-11 by, for example, connecting the bias voltage supply line to a fixed portion of the rotary axis 64 in FIG. 5.

Referring to FIG. 4 again, the drive controller 12 will now be described. A digital signal processor (referred to as a "DSP") 26 to function as a drive processor is provided for the drive controller 12. The DSP 26 receives a seek command from a microprocessor unit (referred to as an "MPU") 28 of an upper control unit 15 and controls the voice coil motor 16 of the disk enclosure 10, thereby positioning each head to the cylinder address designated in the magnetic disk by the head actuator 68 in FIG. 5. A position signal forming circuit 36 for forming a head position signal is provided for the head positioning control of the DSP 26. A read signal of the servo head 18 is supplied to the position signal forming circuit 36. In the embodiment, servo information is recorded on the data surface of the disk medium and the position signal forming circuit 36 forms a position signal indicative of the head position on the basis of the read signal of the phase servo information. The position signal from the position signal forming circuit 36 is converted to the digital data by an A/D converter 38 and is sent to the DSP 26. The DSP 26 controls the spindle motor 14 through a D/A converter 32 and a driver 34 and drives the VCM 16 through a D/A converter 40 and a driver 42, thereby performing the positioning control of the head by the rotation of the head actuator 68 in FIG. 5.

The head positioning control by the DSP 26 is divided to a seek control for moving the head to a target cylinder on the basis of the seek command and an on-track control for maintaining the on-track state by the arrival of the head to the target cylinder. The seek control comprises a coarse control and a fine control. The coarse control is a control for moving the head to a position just before the target cylinder in accordance with a target speed pattern. The fine control is a control for switching the control mode from a speed control to a position servo control and for positioning the head to the target cylinder when the head reaches a position just before the target cylinder, for example, 0.5 cylinder before by the coarse control. Therefore, after the seek command was received from the upper control unit 15, the DSP 26 doesn∝t need to receive the seek command in principle until the reading operation or writing operation is finished.

On the other hand, in order to read or write from/to the data surface of the magnetic disk, a reading amplifier 44 and a writing amplifier 48 are provided. During the reading operation, the data head IC 24 selects the head of the head address designated from the upper control unit 15 by a switching signal from the DSP 26. The read signal read out from the selected head is amplified by a built-in pre-amplifier and, after that, it is supplied to the reading amplifier 44. The reading amplifier 44 amplifies the read signal to the signal level which is necessary to transfer to the upper control unit 15 and, after that, transmits the amplified signal to a formatter section 52 of the upper control unit 15 through a read signal line 46. A VFO, an equalizer section, and a data demodulating section are provided for the formatter section 52 in correspondence to the read signal obtained from the read signal line 46, thereby reconstructing the read data from the received read signal and outputting.

A write signal formed on the basis of write data is supplied from the formatter section 52 of the upper control unit 15 to the writing amplifier 48 through a write signal line 50. The input write signal is amplified by the writing amplifier 48 and, after that, it is supplied to the head selected by the instruction from the DSP 26 at that time through the data head IC 24, and is written to the magnetic disk.

Further, a bias current control circuit 54 is provided for the drive unit 12. The bias current control circuit 54 receives a control signal from the DSP 26 in the reading operation and supplies a bias voltage to the read head (MR head) through the data head IC, thereby allowing a bias current to flow.

According to the invention, in such a drive unit, a data bus disconnecting circuit 30 is provided for the data bus for connecting the DSP 26 of the drive controller 12 and the MPU 28 of the upper control unit 15. That is, the DSP 26 is connected to the data bus disconnecting circuit 30 through a data bus 58 and the data bus disconnecting circuit 30 is connected to the MPU 28 of the upper control unit 15 through a data bus 56. Further, a command notification signal E1 for notifying the generation of a command is supplied from the MPU 28 to the DSP 26 by a control line 55-1. In order to control the data bus disconnecting circuit 30, a data bus disconnection signal E2 is supplied from the MPU 28 by a control line 55-2. The data bus disconnection signal E2 is held at the H level for a period of time during which the read gate is set to the active state by the reading operation by the MPU 28. When the data bus disconnection signal E2 from the MPU 28 is set to the H level, the data bus disconnecting circuit 30 disconnects the connection state between the data buses 56 and 58. When the data bus disconnection signal E2 is returned to the L level, the data buses 56 and 58 are connected again.

A control line 55-3 is connected from the DSP 26 to the data bus disconnecting circuit 30. In the case where an error occurs on the drive controller 12 side during the reading operation, the control line 55-3 generates an error generation interruption signal E3. The control line 55-3 is further branched as a control line 55-4 and is connected to the MPU 28 of the upper control unit 15, thereby supplying the same error generation interruption signal E3.

Further, a control line 55-5 is connected from the DSP 26 to the data disconnecting circuit 30, thereby supplying a bus release request signal E4. The bus release request signal E4 is provided for the case of forcedly performing the seeking operation by a command from the upper control unit 15 even during the reading operation in a state in which the data buses are disconnected. That is, when the DSP 26 receives the command notification signal E1 indicating that the seek command is outputted through the control line 55-1 during the reading operation, the DSP 26 supplies the bus release request signal E4 to the data bus disconnecting circuit 30, thereby connecting the data buses 56 and 58 and returning to a state in which a command can be received by the MPU 28. As a forced seeking operation which needs the output of the bus release request signal E4 during the reading operation, for example, there is a device resetting operation. The device resetting operation is a process for resetting the drive unit and returning to the initial state, for example, in the case where a program of the MPU 28 of the upper control unit 15 runs away. Since the head is positioned to the 0 cylinder in order to return the drive unit side to the initial state, when recognizing the device resetting state during the reading operation, the DSP 26 generates the bus release request signal E4, thereby returning the data bus disconnecting circuit 30 to the connection state of the data buses 56 and 58 and enabling the seek command from the MPU 28 to the 0 cylinder to be received.

Figure 7:
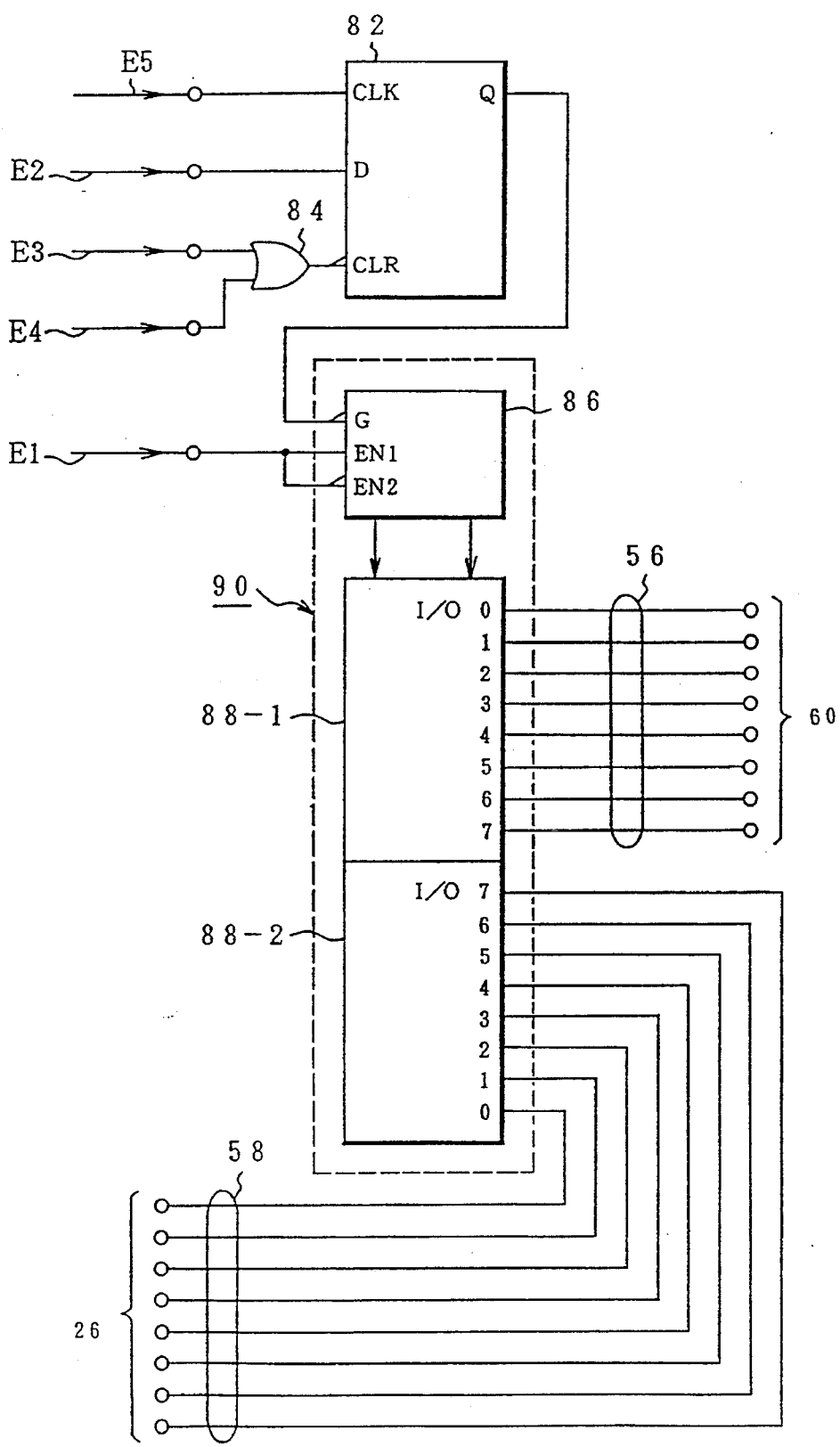
FIG. 7 is a circuit block diagram of a data bus disconnecting circuit in FIG. 4.

FIG. 7 shows a practical embodiment of the data bus disconnecting circuit 30 in FIG. 4. The data bus disconnecting circuit comprises: a D-FF 82; a control circuit 86; and a driver/receiver having switching circuits 88-1 and 88-2. As a driver/receiver 90, for example, an LS245 made by Fujitsu Ltd. can be used. A clock signal E5 for a latching operation is supplied to a clock terminal CLK of the D-FF 82. The data bus disconnection signal E2 is supplied to a data terminal D. The error generation interruption signal E3 or bus release request signal E4 is supplied to a clear terminal CLR through an OR gate 84.

When the data bus disconnection signal E2 is set to the H level in the active state, the signal E2 is latched to the D-FF 82 at a leading timing of the clock signal E5, so that a Q output is set to the H level. The Q output of the D-FF 82 is supplied to a control terminal G of the control circuit 86. When the Q output is at the H level, the control circuit 86 sets the switching circuits 88-1 and 88-2 to the disconnection state, thereby disconnecting the data buses 56 and 58. When the Q output is set to the L level, the control circuit 86 sets the switching circuits 88-1 and 88-2 to the connection state, thereby connecting the data buses 56 and 58. The command notification signal E1 is supplied to enable terminals EN1 and EN2 of the control circuit 86. When the command notification signal E1 is at the L level, it forms a signal transmission state from the MPU 28 of the upper control unit 15 to the DSP 26 of the drive controller 12. When the command notification signal E1 is at the H level, it forms a signal transmission state from the DSP 26 of the drive controller 12 to the MPU 28 of the upper control unit 15.

Specifically speaking, each of the switching circuits 88-1 and 88-2 has a bidirectional transmitting circuit in which a driver and a receiver are connected in parallel every data bus line. When the command notification signal E1 is set to the L level, the receiver side is set to an enable state, thereby enabling the signal transmission from the MPU 28 to the DSP 26. When the command notification signal E1 is set to the H level, the driver side is set to the enabling state, thereby enabling the signal transmission from the DSP 26 to the MPU 28. Further, in the data bus disconnection state in which the Q output of the D-FF 82 is set to the H level, the enable states on both of the driver side and the receiver side are released, thereby forming the data bus disconnection state.

FIGS. 8A to 8D show a situation of the noise elimination by the data disconnecting circuit 30 provided for the drive controller 12. In the reading operation, as shown in FIG. 8A, a read gate is set to an active state at the H level during the reading operation by the MPU 28 of the upper control unit. In association with the active state of the read gate, the data bus disconnection signal E2 is set to the H level and is outputted by the MPU 28 of the upper control unit 15 through the control line 55-2. Thus, the data buses 56 and 58 connecting the MPU 28 and the DSP 26 are set to the disconnection state during the reading operation and the switching operations of the data buses are stopped as shown in FIG. 8D. Therefore, as shown in FIG. 8C, noises 92 which have already been mixed synchronously with the switching of the data buses before the reading operation are not mixed during the reading operation in the data bus disconnection state. Only a read waveform 94 is obtained and outputted to the formatter section 52 of the upper control unit 15 through the read amplifier 44. As mentioned above, since the noises in association with the data bus operation are not mixed to the read waveform 94, the read data can be accurately reconstructed in the formatter section 52 of the upper control unit 15.

After completion of the reading operation, the data bus disconnection signal E2 is set to the L level and the data bus disconnecting circuit 30 release the disconnection state and returns to the original state. The data buses 56 and 58 are connected again, thereby starting the bus operation.

In the above embodiment, although the DSP 26 has been used as a drive controller 12, an MPU can be also used in a manner similar to the upper control unit 15. The present invention is not limited by the numerical values shown in the embodiment.

What is claimed is:

1. A noise eliminating apparatus of a magnetic disk trait, comprising:

a drive unit which has a processor for positioning a head to a cylinder address of a disk medium designated by a seek command notified from an upper apparatus and which transmits an analog read signal read out from said disk medium in a head positioning state of said processor through a read signal line;

a data bus for connecting said processor and said upper apparatus; and a data bus disconnecting circuit, inserted in said data bus, for switching said data bus for a period of time during which a read control signal is generated from said upper apparatus while said disk medium is being read and for returning said data bus to a connection state when said read control signal is interrupted;

wherein said processor generates an error generation interruption signal to said upper apparatus and said data bus disconnecting circuit when an error generation is detected during the reading operation, and said data bus disconnecting circuit returns said data bus to the connection state when said error generation interruption signal is received from said processor in a disconnection state of said data bus.

2. An apparatus according to claim 1, wherein said data bus disconnecting circuit switches said data bus to the disconnection state by a control signal which is generated in an active state of a read gate in said upper apparatus.

3. An apparatus according to claim 1, wherein said processor generates a bus release request signal to said data bus disconnecting circuit in the case where a command notification signal indicating that a command is generated from said upper apparatus is received during the data reading operation, and said data disconnecting circuit returns said data bus to the connection state in the case where the bus release request signal is received from said processor in the disconnection state of said data bus.

4. An apparatus according to claim 1, wherein said drive unit comprises: a drive controller having said processor; and a disk enclosure including a disk medium, a head, a head actuator, and a spindle motor, and wherein said head integrally has a write head and a read head, at least said read head is an MR (magnetoresistive) head, and a predetermined bias voltage is applied to said MR head and said disk medium from said drive controller side.

5. An apparatus according to claim 1, wherein said processor of said drive unit is a digital signal processor.

6. A noise eliminating method of a magnetic disk unit, comprising the steps of:

positioning a head to a cylinder address of a disk medium designated by a command notified from an upper apparatus;

transmitting an analog read signal read out from said disk medium in said head positioning state through a read signal line; and switching said data bus to a disconnection state for a period of time during which a read control signal is generated from said upper apparatus while said disk medium is being read and returning said data bus to a connection state when said read control signal is interrupted;

wherein an error generation interruption signal is outputted to said upper apparatus and said disconnection state of said data bus is returned to the connection state when an error generation is detected during the reading operation.

7. A method according to claim 6, wherein said data bus is switched to the disconnection state by a control signal which is outputted in an active state of a read gate in said upper apparatus.

8. A method according to claim 6, wherein when said drive unit receives a command notification signal indicating that a command is generated from said upper apparatus during the data reading operation, said data bus in said disconnection state is returned to the connection state.

9. A magnetic disk unit comprising:

an MR head for reading out recording information of a disk medium;

a bias current supplying circuit for supplying a bias current to said MR head when reading;

a processor for positioning said MR head to a cylinder address of a disk medium designated by a command which is notified from an upper apparatus;

a bus which is connected between said upper apparatus and said processor and whose signal state is switched from said upper apparatus to said processor or from said processor to said upper apparatus at predetermined clock intervals and which transfers a command;

a read signal line, connected between said upper apparatus and said processor, for transmitting a read signal from said processor to said upper apparatus; and a bus disconnecting circuit, imparted in said bus and having a bidirectional transmitting circuit in which a driver and a receiver are connected in parallel in opposite directions, for releasing enable states of both of said driver and said receiver and forming a bus disconnection state when said read signal is being transmitted by said read signal line.

* * * * *

UNITED STATES PATENT AND TRADEMARK OFFICE
CERTIFICATE OF CORRECTION

PATENT NO. :     5,566,296
DATED     :     October 15, 1996
INVENTOR(S) :     Ohmori et al.

Page 1 of 10

It is certified that error appears in the above-indentified patent and that said Letters Patent is hereby corrected as shown below:

Column 1, line 8, after "preventing", delete "that" and after "noises", insert --that--.

Column 1, line 12, after "preventing", delete "that".

Column 1, line 35, after "notifies", delete "the completion of the".

UNITED STATES PATENT AND TRADEMARK OFFICE
CERTIFICATE OF CORRECTION

PATENT NO. : 5,566,296
DATED : October 15, 1996
INVENTOR(S) : Ohmori et al.

It is certified that error appears in the above-indentified patent and that said Letters Patent is hereby corrected as shown below:

Column 1, lines 35-36, before "the", delete "seeking operation to" and after "controller", insert --of the completion of the seeking operation--.

Column 1, line 39, after "head and", delete "is".

Column 1, line 62, after "used", delete "as" and insert --for--, after "recent", delete "years," and insert --years--.

UNITED STATES PATENT AND TRADEMARK OFFICE
CERTIFICATE OF CORRECTION

PATENT NO. :     5,566,296
DATED :     October 15, 1996
INVENTOR(S) :     Ohmori et al.

It is certified that error appears in the above-indentified patent and that said Letters Patent is hereby corrected as shown below:

Column 2, line 1, after "that", delete "those" and insert --these--.

Column 2, line 10, after "applied", delete "is come" and insert --comes--.

Column 2, line 11, after "causing", delete "a".

Column 2, line 12, after "Therefore", delete "by also".

Column 2, line 13, after "both", delete "of".

UNITED STATES PATENT AND TRADEMARK OFFICE
CERTIFICATE OF CORRECTION

PATENT NO. : 5,566,296  Page 4 of 10
DATED : October 15, 1996
INVENTOR(S) : Ohmori et al.

It is certified that error appears in the above-indentified patent and that said Letters Patent is hereby corrected as shown below:

Column 2, lines 13-14, before "to", delete "they are set" and insert --sets the disk medium and casing side--, and after "and", delete "a".

Column 2, line 15, after "of", delete "a" and after "and", delete "a" and insert --the--.

Column 2, line 17, after "invention", delete "has" and insert --have--.

Column 2, lines 17-18, after "examined", delete "to miniaturize" and insert --miniaturizing--.

UNITED STATES PATENT AND TRADEMARK OFFICE
CERTIFICATE OF CORRECTION

PATENT NO. : 5,566,296
DATED : October 15, 1996
INVENTOR(S) : Ohmori et al.

It is certified that error appears in the above-indentified patent and that said Letters Patent is hereby corrected as shown below:

Column 2, lines 24-25, before "a", delete "there occurs" and after "problem", insert --occurs--.

Column 2, line 26, after "mixed", delete "to" and insert --with--.

Column 2, line 30, after "mixed", delete "to" and insert --with--.

Column 2, line 33, after "Such", delete "noises of the read waveform" and insert --read waveform noises--.

UNITED STATES PATENT AND TRADEMARK OFFICE
CERTIFICATE OF CORRECTION

PATENT NO. : 5,566,296
DATED : October 15, 1996
INVENTOR(S) : Ohmori et al.

Page 6 of 10

It is certified that error appears in the above-indentified patent and that said Letters Patent is hereby corrected as shown below:

Column 2, line 33, delete "don∝t" and insert --don't--.

Column 2, lines 34-35, delete " by remarkably miniaturizing" and insert --when miniaturized--.

Column 2, line 36, after "is", delete "that" .

Column 2, line 42, delete "to" and insert --with--.

UNITED STATES PATENT AND TRADEMARK OFFICE
CERTIFICATE OF CORRECTION

PATENT NO. : 5,566,296
DATED : October 15, 1996
INVENTOR(S) : Ohmori et al.

It is certified that error appears in the above-indentified patent and that said Letters Patent is hereby corrected as shown below:

Column 2, line 47, after "50mV", delete "which" and insert --(which--; after "output", delete "voltage" and insert --voltage).

Column 2, line 63, after "noises", insert --generated--.

Column 2, line 64, before "a read", delete "to" and insert --with--.

Column 3, line 2, delete "information," and insert --information--.

UNITED STATES PATENT AND TRADEMARK OFFICE
CERTIFICATE OF CORRECTION

PATENT NO. : 5,566,296
DATED : October 15, 1996
INVENTOR(S) : Ohmori et al.

It is certified that error appears in the above-indentified patent and that said Letters Patent is hereby corrected as shown below:

Column 3, line 6, delete "into" and insert --with--.

Column 4, line 4, delete "apparatus," and insert --apparatus.--.

Column 5, line 4, delete "to 60-1" and insert --to 60-11--.

Column 5, line 37, delete "and 60-1," and insert --and 60-11,--.

UNITED STATES PATENT AND TRADEMARK OFFICE
CERTIFICATE OF CORRECTION

PATENT NO. : 5,566,296
DATED : October 15, 1996
INVENTOR(S) : Ohmori et al.

It is certified that error appears in the above-indentified patent and that said Letters Patent is hereby corrected as shown below:

Column 6, line 24, delete "doesn∝t" and insert --doesn't--.

Column 8, line 25, after "In the", insert --upper apparatus--.

Column 8, line 31, after "line 55-2", insert --as shown in Fig 8B--.

Column 8, line 58 delete "trait," and insert --unit,--.

UNITED STATES PATENT AND TRADEMARK OFFICE
CERTIFICATE OF CORRECTION

PATENT NO. : 5,566,296
DATED : October 15, 1996
INVENTOR(S) : Ohmori et al.

It is certified that error appears in the above-indentified patent and that said Letters Patent is hereby corrected as shown below:

Column 10, line 40, delete "imparted" and insert --inserted--.

Signed and Sealed this

Ninth Day of December, 1997

Attest:

Attesting Officer

BRUCE LEHMAN

Commissioner of Patents and Trademarks